United States Patent
Grawunde

(10) Patent No.: US 9,273,702 B2
(45) Date of Patent: Mar. 1, 2016

(54) DYNAMICALLY ADJUSTING COUNTERBALANCE VALVE

(71) Applicant: Sun Hydraulics Corporation, Sarasota, FL (US)

(72) Inventor: Frederick G. Grawunde, Sarasota, FL (US)

(73) Assignee: Sun Hydraulics Corporation, Sarasota, FL (US)

( * ) Notice: Subject to any disclaimer, the term of this patent is extended or adjusted under 35 U.S.C. 154(b) by 560 days.

(21) Appl. No.: 13/657,334

(22) Filed: Oct. 22, 2012

(65) Prior Publication Data

US 2013/0233409 A1    Sep. 12, 2013

Related U.S. Application Data

(60) Provisional application No. 61/550,052, filed on Oct. 21, 2011.

(51) Int. Cl.

| | |
|---|---|
| *F16K 31/36* | (2006.01) |
| *F15B 13/01* | (2006.01) |
| *F16K 17/06* | (2006.01) |
| *F15B 13/02* | (2006.01) |

(52) U.S. Cl.
CPC ............. *F15B 13/01* (2013.01); *F15B 13/024* (2013.01); *F15B 13/029* (2013.01); *F16K 17/065* (2013.01); *Y10T 137/2554* (2015.04); *Y10T 137/777* (2015.04); *Y10T 137/7766* (2015.04)

(58) Field of Classification Search
CPC  F16K 17/105; G05D 16/10; Y10T 137/7766; Y10T 137/7769; Y10T 137/777
USPC .......................... 137/485, 491, 494, 487, 486
See application file for complete search history.

(56) References Cited

U.S. PATENT DOCUMENTS

| | | | |
|---|---|---|---|
| 3,586,082 A | 6/1971 | Muller | |
| 4,248,265 A | 2/1981 | Freeman, Jr. | |
| 4,742,846 A | 5/1988 | DiBartolo | |
| 4,860,788 A * | 8/1989 | Asaoka | F15B 13/015 137/491 |
| 5,050,636 A | 9/1991 | Sagawa et al. | |
| 5,381,823 A | 1/1995 | DiBartolo | |
| 6,119,722 A | 9/2000 | Zaehe | |
| 6,640,830 B2 | 11/2003 | Zähe | |
| 7,467,642 B2 | 12/2008 | Prinsen et al. | |
| 2003/0131889 A1* | 7/2003 | Kim | F16K 1/42 137/491 |
| 2004/0173264 A1* | 9/2004 | Holder | 137/494 |
| 2005/0178444 A1* | 8/2005 | Cheong | F16K 17/105 137/491 |
| 2006/0266419 A1* | 11/2006 | Krug-Kussius | F16K 17/105 137/491 |
| 2007/0056632 A1* | 3/2007 | Cheong | F16K 17/105 137/491 |
| 2009/0211650 A1* | 8/2009 | Jeon | F16K 17/105 137/488 |

FOREIGN PATENT DOCUMENTS

| | | |
|---|---|---|
| DE | 3305282 | 8/1983 |
| WO | 03/042587 | 5/2003 |

OTHER PUBLICATIONS

International Search Report mailed Jan. 22, 2013 for PCT/US2012/061293 filed Oct. 22, 2012, 4 pages.

* cited by examiner

*Primary Examiner* — R. K. Arundale
(74) *Attorney, Agent, or Firm* — Feldman Gale, P.A.; Walter C. Frank

(57) ABSTRACT

A counterbalance valve is provided with load-sensing, hydro-mechanically setting, features. The counterbalance valve relief setting changes dynamically based on the load pressure at the load port of the counterbalance valve.

7 Claims, 14 Drawing Sheets

Cross-Sectional Side View of a Prior Art, three-Port Counterbalance Valve

Cross-Sectional Side View of a Prior Art, three-Port Counterbalance Valve

Key to chart title: R= Engine revs, A= Angle of boom, L= Load ;0 = Boom only, 2T = Boom fitted with 2 Tonne load

DYNAMICALLY ADJUSTING COUNTERBALANCE VALVE

CROSS-REFERENCE TO RELATED APPLICATIONS

This application claims the benefit of U.S. Provisional Application No. 61/550,052 filed Oct. 21, 2011, the disclosure of which is hereby incorporated herein by reference in its entirety.

FIELD OF THE INVENTION

This invention relates to the field of counterbalance, load control, motion control and overcenter valves.

BACKGROUND

Prior Art Counterbalance Valves

Counterbalance (CB) valves are applied in various hydraulic circuits and are used to hold, capture, or control the motion of loads. Essentially, CB valves are modulating devices that allow free flow from an inlet valve port to a load port and then block reverse flow until a load pressure, pilot pressure, or combination of load and pilot pressure open the valve. Modern CB valves control loads and minimize instability (e.g., chattering) in machines. As a result, CB valves are frequently incorporated in positioning circuits, load-holding and purging circuits, and regenerative circuits. Examples of machines that utilize CB valves are boom lifts, forklifts, industrial drills, and excavators, among many other machines.

The modulation of conventional CB valves is a function of both load pressure and pilot pressure. This characteristic ensures loads must be driven from a fluid power source, even when loads are overrunning. FIG. 3 graphically depicts how pilot pressure decreases as load pressures increases. In particular, the graph of FIG. 3 illustrates a prior art CB valve in which pilot pressure I changes as load pressure II rises steadily with time to a predetermined maximum setting III. On the other hand, pilot pressure would rise if load pressure fell steadily over time.

FIG. 1 illustrates a prior art, three port, pilot-to-open CB valve 1001 having a valve body 1038, a load port 1004, a valve port 1008, and a pilot port 1012. In operation, CB valve 1001 serves as a counterbalance and holds a load at load port 1004. If the load pressure applied at load port 1004 exceeds the spring force created by springs 1020, then piston 1032 moves axially to compress springs 1020. Such axial movement of the piston to an open position creates a flow path between load port 1004 and valve port 1008, or put differently, it provides a relief function. Because having only a relief function is inefficient, a pilot function is also provided. The pilot function allows a user to apply pilot pressure to open a flow path between the load port 1004 and the valve port 1008. As a result, pressure at either the load port or the pilot port can be used to open a flow path between the load port and the valve port. A combination of pressure at the load port and the pilot port will also open a flow path.

Traditional CB valves have a fixed or adjustable setting. Fixed setting valves are typically set by the manufacturer and are not adjustable. Adjustable CB valves feature adjustment screws so the setting can be changed in the field. While settings can be set in the field, settings are not typically changed when the valves are being operated. CB valves with adjustment screws are illustrated in FIGS. 1 and 2. Adjusting CB valves generally involves rotating adjusting screw 1024 when the CB valve is not in operation. Rotating adjusting screw 1024 changes the compression of springs 1020, thus changing the setting of the CB valve. More specifically, when springs 1020 are in an uncompressed position, the CB valve allows piston 1032 to slide to an open position at a low load pressure. In contrast, when the springs are adjusted to a compressed position, a greater load pressure is necessary to move the piston to an open position.

FIG. 2 illustrates a prior art, four port, pilot-to-open CB valve 1036. CB valve 1036 is vented to eliminate the effect back pressure on the valve port has on the operation of the valve. In particular, CB valve 1036 is provided with drain or vent port 1016 that eliminates sensitivity to back pressure.

Drawbacks of Prior Art Counterbalance Valves

Although CB valves have highly desirable qualities in the hold, capture, and motion control of loads in hydraulic circuits, CB valves also have drawbacks. CB valves must be set for the maximum load that a machine must control. One significant drawback is increased energy consumption in machines that utilize conventional CB valves, when load pressures vary significantly over the operating cycle. Another drawback is increased wear in machines and machine components when high pilot pressures are frequently needed to control light loads. Although energy efficiency and wear and tear have long been important considerations in machine design, the current economic, environmental, and political atmosphere has led to an extraordinary demand for innovations that improve efficiency and longevity of machines, including machines that incorporate CB valves.

Both increased energy consumption and wear of machines operating with traditional CB valves are owed, at least in part, to CB setting and pilot ratio. First, for control and safety purposes, to maintain control of maximum anticipated loads, CB valves are typically set above the maximum load pressure that could be generated. In many machines, however, maximum loads may be encountered infrequently. That is, the majority of time during which a CB valve is in operation, the load pressure is some amount less than the CB setting. During that time, an increase in pilot pressure is necessary to compensate for the difference between the valve setting and the load pressure. Second, and of significant importance, up to half of the working cycle of many CB valves is dedicated to the control of nominal loads, where machines are unloaded. This means that for up to half of its working cycle, and sometimes more, a CB valve may require use of full or high pilot pressure.

By way of example, a forklift may be used to raise a full pallet, where it is unloaded and then lowered completely empty. Lowering the empty fork typically requires high pilot pressure. Generating high pilot pressure, of course, necessitates the use of high horsepower and energy. In a forklift, significant pilot pressure, and energy, may be required when lowering any load less than a full load.

As a result, there is a real need for devices that provide the hold, capture, and motion control benefits of current CB valves while improving upon one or more performance characteristics of current CB valves.

BRIEF SUMMARY

One or more of the preceding drawbacks of currently available CB valves are improved, and an advance is made in the art by a novel counterbalance valve. According to one aspect of the present invention, a CB valve is provided with dynamic, load-sensing, hydro-mechanically setting features.

According to another aspect of the present invention, a counterbalance valve is provided in which the relief setting changes dynamically based on the load pressure at the load port. In this embodiment, the pilot pressure necessary to open the CB valve is relatively low and consistent, regardless of the actual load on the load port.

According to another aspect of the present invention, a counterbalance valve is provided with a primary chamber. The chamber is outfitted with a load port, a valve port, and a pilot port, all of which are configured to communicate with the primary chamber. A piston is also positioned within the primary chamber. The piston slides between an open position and a closed position. In the open position a fluid passageway is established between the load port and the valve port. In the closed position the load port does not communicate with the valve port. In addition, a sleeve is provided within the primary chamber. The sleeve is slidable between a minimum position and a maximum position. One or more springs are disposed within the sleeve. A ball holder is also disposed within the sleeve. The ball holder compresses the spring(s) within the sleeve. A ball is disposed between the ball holder and the piston such that the sleeve, spring, ball holder, and the ball collectively bias the piston into the closed position. A grounding spring is also provided to bias the sleeve into the minimum position. The counterbalance valve is also provided with a guide cap fixed to the primary chamber. The guide cap defines a terminal chamber for receiving a portion of the sleeve. The guide cap is also provided with a cap seal having a first diameter. The cap seal forming a fluid seal between the guide cap and the sleeve. Another seal having a smaller than the diameter of the cap seal is also provided, thereby creating a differential area within the counterbalance valve.

According to another aspect of the invention, the counterbalance valve may include a plug disposed within the sleeve. The plug allows rapid ingress of fluid into the terminal chamber but limits the rate of egress of fluid from the terminal chamber. According to another aspect of the invention, the counterbalance valve can be provided with a drain port.

BRIEF DESCRIPTION OF THE DRAWINGS

FIG. 8 illustrates a cross-sectional side view of a three-port counterbalance valve installed in a manifold body according to one aspect of the present invention;

DETAILED DESCRIPTION

The following detailed description and the appended drawings describe and illustrate exemplary embodiments of the invention solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings may not be to scale and in certain instances details have been omitted, which are not necessary for an understanding of the present invention, such as conventional details of fabrication and assembly.

DEFINITIONS

Back Pressure: pressure at the valve port caused by downstream restrictions or precharge in a system.

Chattering: undesirable and uncontrolled opening and closing of a valve resulting in poor valve modulation.

Load Pressure ($P_{load}$): load applied to the load port.

Maximum Setting ($S_{max}$): maximum control pressure determined by the spring pack and component geometry.

Maximum Working Pressure ($P_{mw}$): load pressure at which the dynamic adjustment reaches the maximum setting.

Minimum Setting ($S_{min}$): minimum control pressure as determined by the spring pack and component geometry.

Pilot Pressure ($P_{pilot}$): pressure required on the pilot port to open the valve.

Pilot Ratio (R): relief area divided by pilot area or ratio that acts as a multiplier to reduce the mechanical setting of a valve.

Setting (S): load pressure at which the valve begins to unseat or open.

Setting Offset ($S_{offset}$): constant value which adds to load pressure to establish the setting for Example 2.

Setting Rate ($S_{rate}$): rate at which setting increases due to load pressure for Example 1.

Threshold Pressure ($P_t$): load pressure at which setting begins to dynamically change.

PARTS LIST

Figure 9:
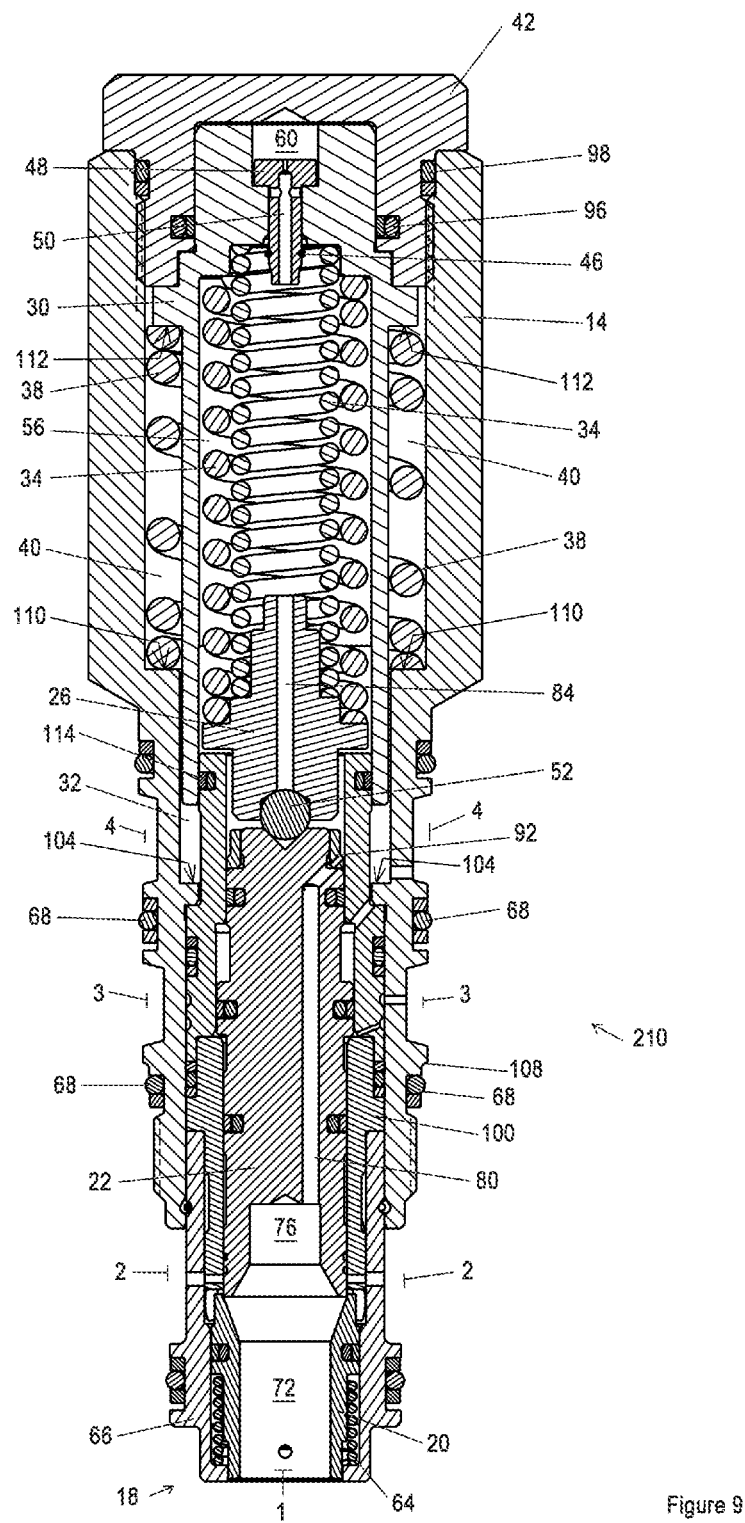
FIG. 9 illustrates a cross-sectional side view of a four port counterbalance valve according to one aspect of the present invention, at minimum setting and seated or closed condition.

1 Load Port
2 Valve Port
3 Pilot Port
4 Drain Port
5 Manifold
10 CB Valve
13 Main Stage 14 Valve Body
15 Setting Control Region
18 Nose
20 Poppet
22 Piston
26 Ball Holder
30 Sleeve
32 Slide Chamber
34 Interior Springs
38 Grounding Spring
40 Grounding Chamber
42 Guide Cap
46 Wire Ring
48 Bypass Plug
50 Bypass Plug Orifice
52 Ball
56 Central Chamber
60 Terminal Chamber
64 Check Spring
68 Outer O-ring
72 Poppet chamber
76 Piston Chamber
80 Piston Passageway
84 Ball Holder Passageway
88 Internal O-ring
92 Damping Sleeve
96 Inner Cap Seal Set
98 Outter Cap Seal Set
100 Intermediate Sleeve
104 Valve Body Shoulder
110 Valve body Shoulder for Grounding Spring
112 Sleeve Shoulder
114 Intermediate Sleeve Seal Set
125 Load Pressure
127 Setting
129 Pilot Pressure
210 CB Valve
214 Valve Body Exemplary Embodiments Referring to the drawings, FIGS. 4-8 depict a first illustrative embodiment of a CB valve according to the present invention. CB valve 10 is provided with a valve body 14, a load port 1, a valve port 2, and a pilot port 3. FIG. 9 depicts a second illustrative embodiment of a CB valve according to the present invention. CB valve 210 is provided with a valve body 214, a load port 1, a valve port 2, and a pilot port 3, and drain or vent port 4. In use, CB valves 10 and 210 provide a dynamic, hydro-mechanically changed setting. CB valves 10 and 210 have a setting that varies dynamically between four phases depending on load pressure. The four phases include a minimum setting (FIG. 4), an intermediate closed setting (FIG. 5), an intermediate open setting (FIG. 6), and a maximum setting (FIG. 7), each of which are discussed in detail below. FIG. 8 provides an illustration of CB valve 10 installed in a manifold 5.

Figure 1:
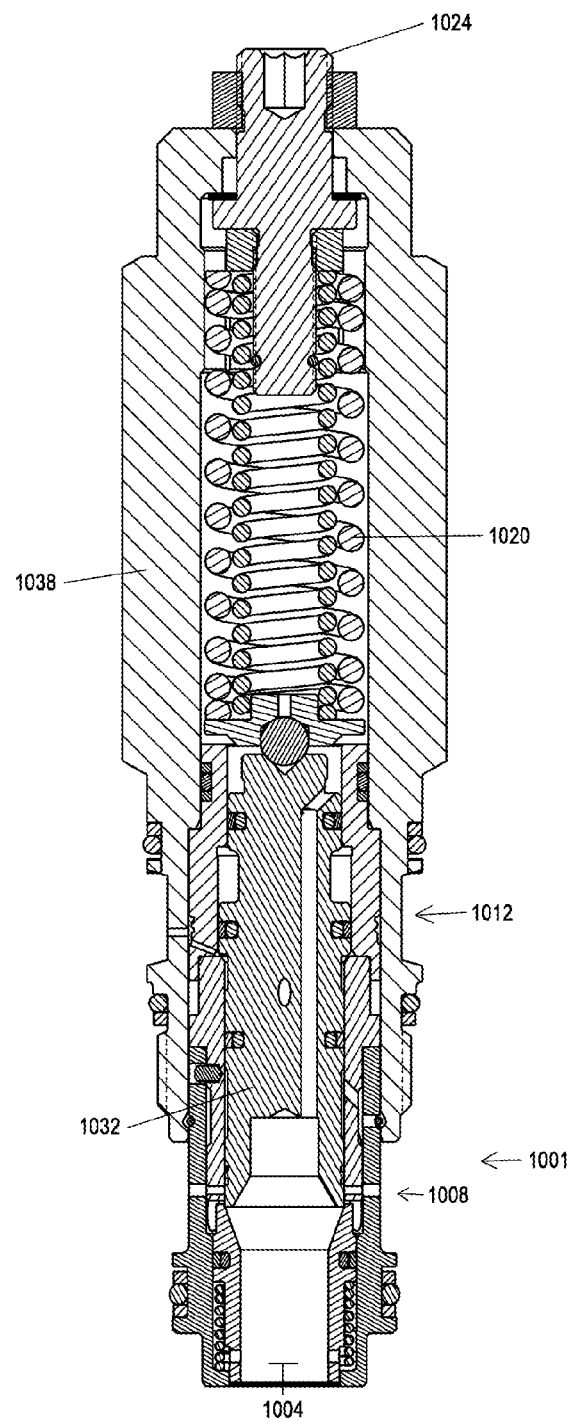
FIG. 1 illustrates a cross-sectional side view of a prior art, three-port counterbalance valve.
Figure 2:
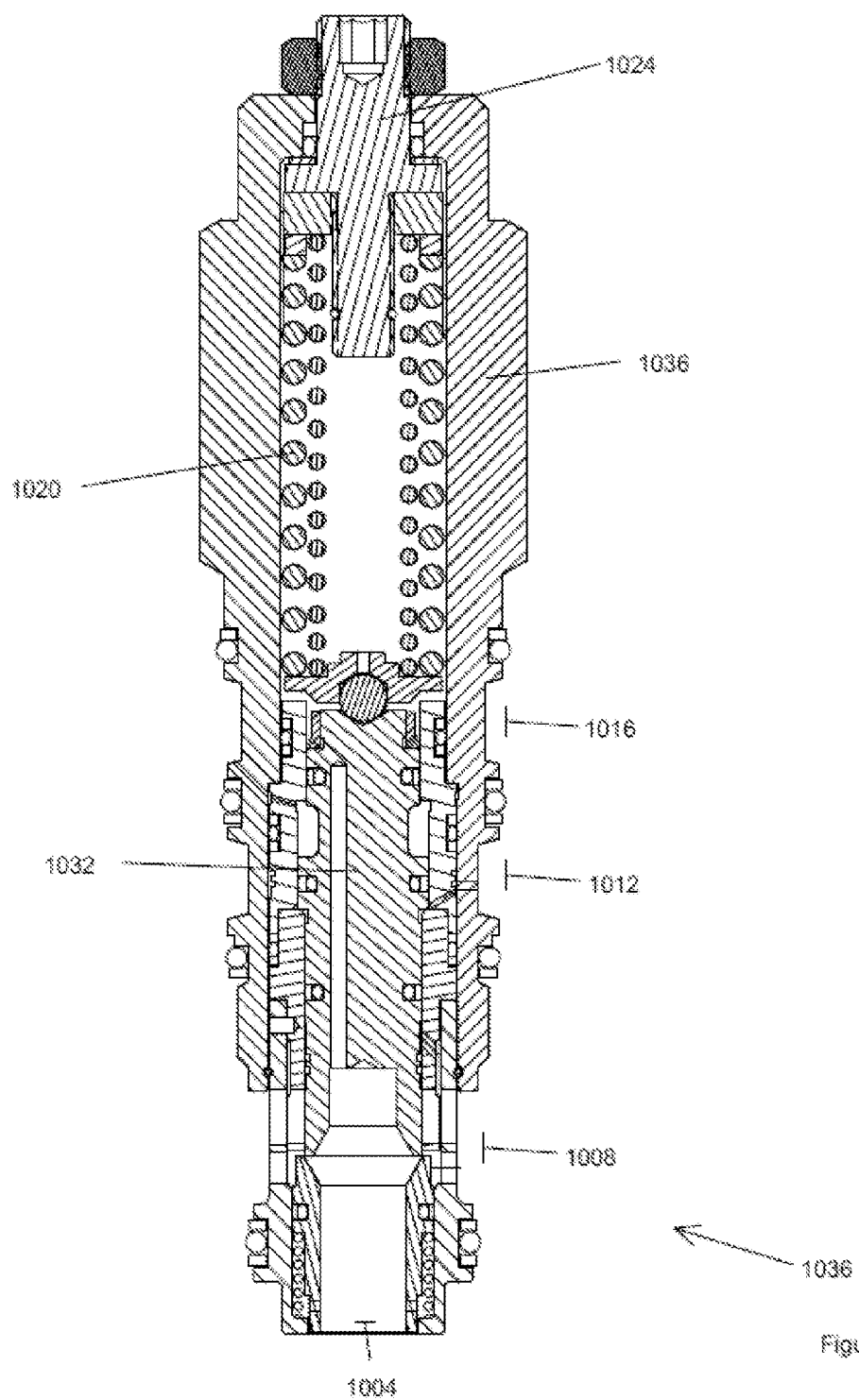
FIG. 2 illustrates a cross-sectional side view of a prior art, four-port counterbalance valve at minimum setting.
Figure 3:
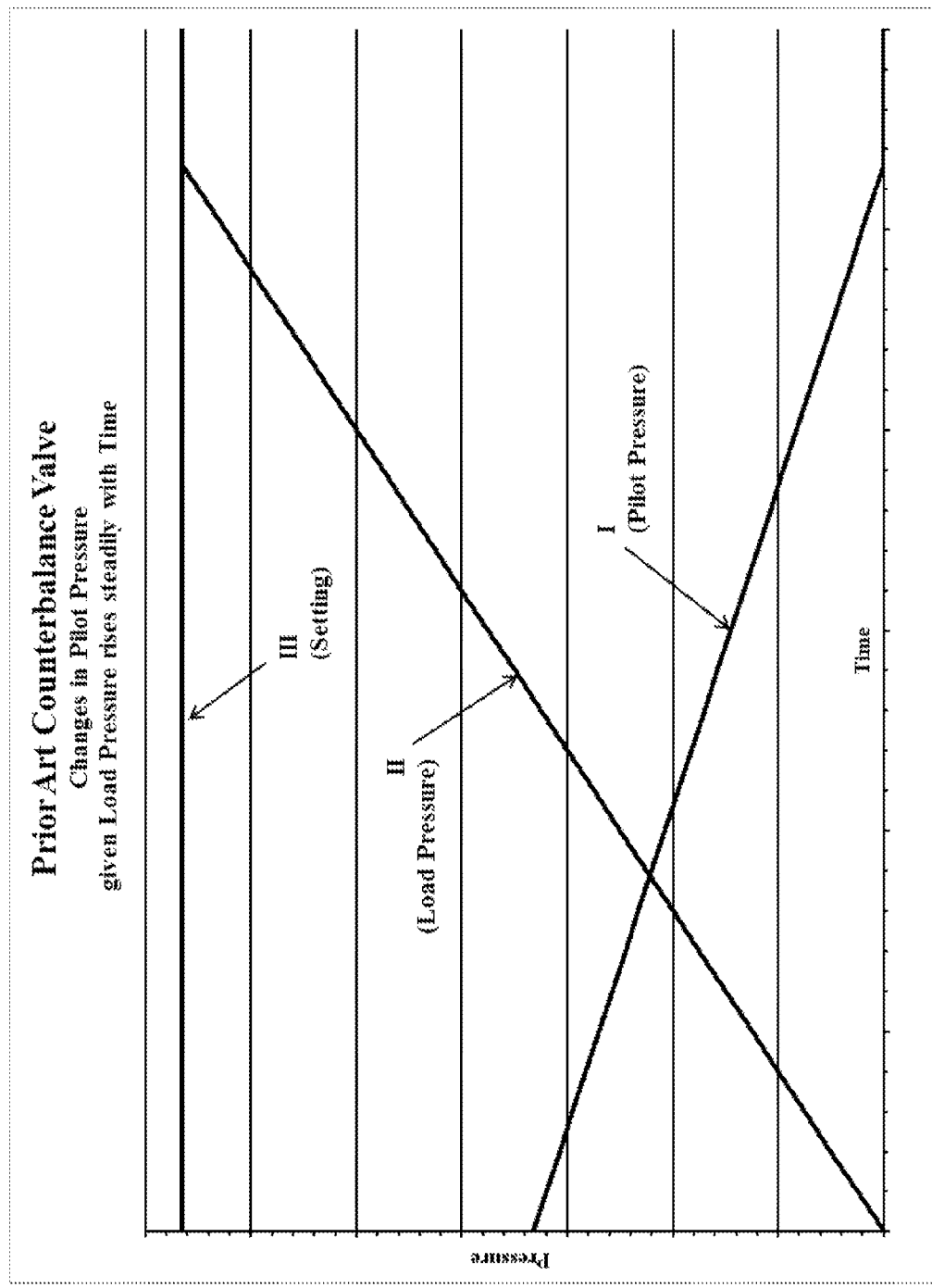
FIG. 3 graphically illustrates the changes in pilot pressure where load pressure rises steadily with time in a prior art CB valve.
Figure 4:
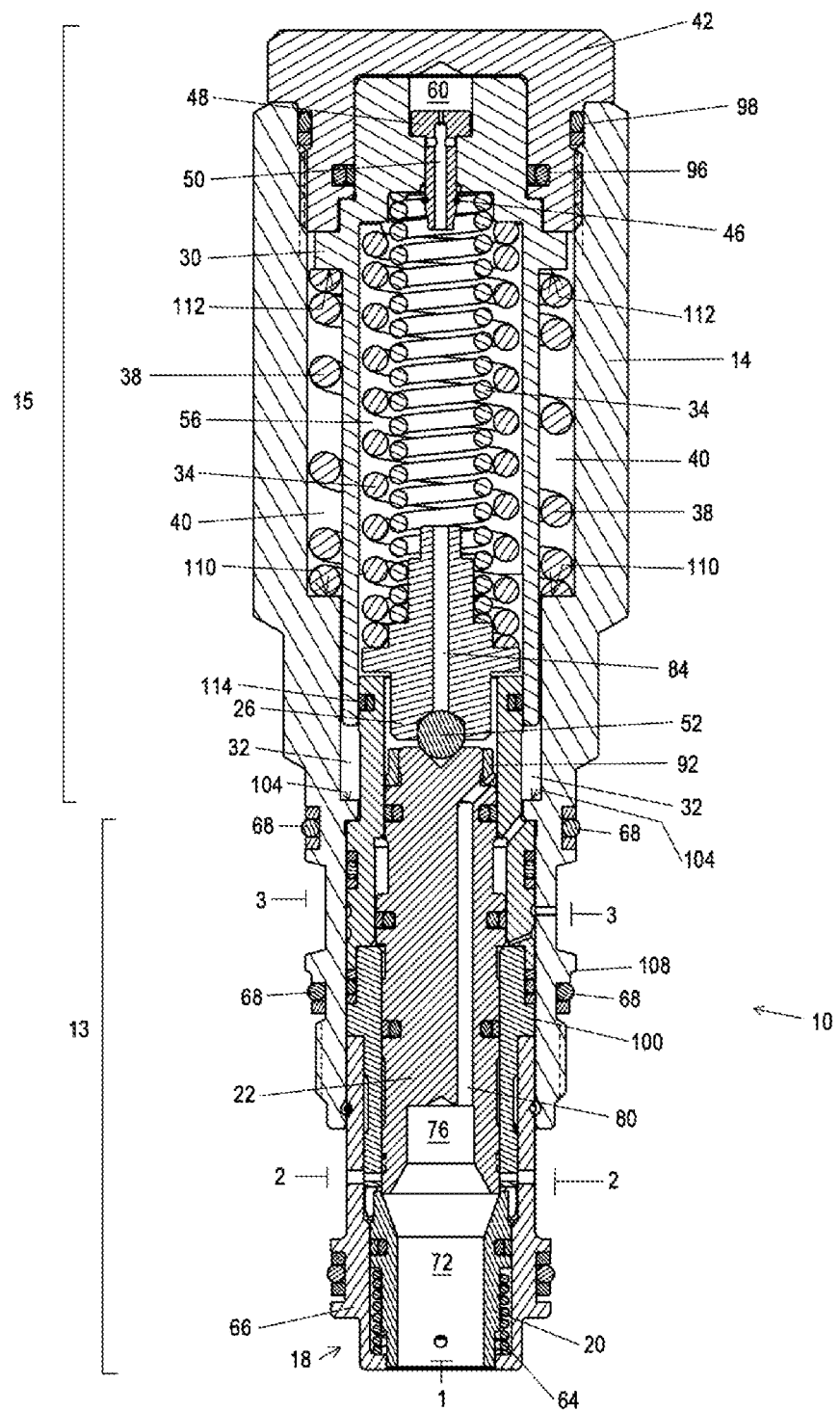
FIG. 4 illustrates a cross-sectional side view of a three-port counterbalance valve according to one aspect of the present invention, at minimum setting and seated or closed condition.

As best shown in FIG. 4, CB valve 10 has a main stage 13 and a setting control region 15. The setting control region 15 includes an outer valve body 14 and end cap 42 that define a working cavity. A sleeve 30 is disposed within the working cavity and along the setting control region such that it can slide axially within the valve body between the guide cap 42 and shoulder 104. Sleeve 30, in turn, contains interior spring(s) 34. More specifically, one or more springs 34, collectively a "spring pack," are compressed between an end of sleeve 30 and ball holder 26. In addition, a ball 52 provides a bearing surface that engages piston 22 and, as a result of the spring force created by interior spring(s) 34, biases piston 22 toward a sealing engagement with poppet 20. Accordingly, the biasing force of compressed spring(s) 34 is transmitted from spring(s) 34 to ball holder 26 to ball 52 to piston 22. This biasing force seals piston 22 and poppet 20.

In addition, a grounding spring 38 is provided between the exterior of sleeve 30 and the interior of valve body 14. Grounding spring 38 is compressed between shoulder 110 and shoulder 112, thereby biasing sleeve 30 toward guide cap 42. The grounding spring 38 along with springs 34 in the spring pack controls the rate at which the CB valve setting increases as load pressure increases. Notably, in the closed position, the interior springs 34, and not the grounding spring, establish the relief setting of piston 22.

As shown in FIGS. 4-7, an axial fluid passageway is provided between load port 1 and terminal cavity 60. Specifically, fluid can communicate from load port 1 through poppet chamber 72, through passageway 80 of piston 22, around ball holder 26 and passageway 84, and into central chamber 56. Fluid further communicates from central chamber 56 through bypass plug 48 into and terminal chamber 60. This fluid passageway is sealed by inner cap seal set 96 and intermediate sleeve seal set 114. As can be seen in the figures, inner cap seal set 96 has a larger diameter than sleeve guide seal set 114, thus creating a differential area that can be acted upon by load pressure. This differential area assists in the axial displacement of sleeve 30 toward load port 1 as load pressure increases on the CB valve 10 and overcomes the directly resisting spring biasing force of the spring pack and grounding spring. A damping sleeve 92 can optionally be added to provide additional dynamic control over fluid passing through channel 80 and into central chamber 56. A second fluid region, the peripheral fluid region, is formed by chamber 40 and chamber 32, both of which communicate with valve port 2 (FIG. 4) or drain port 4 (FIG. 9).

Additionally, a bypass plug 48 having a bypass orifice 50 and wire ring 46 is provided in the terminal end of sleeve 30. The bypass plug 48 is provided to rapidly increase the setting of the valve to support a high load pressure applied to the valve, and slowly decrease the setting of the valve as load is removed. More specifically, as load pressure increases, and the tube sleeve moves axially toward the load port (as detailed below), the bypass plug 48 shifts toward the guide cap 42, and opens a larger diameter flow path. This allows the sleeve 30 to move rapidly toward the load port as the load pressure is increasing. On the other hand, as load pressure falls rapidly, the tube tends to respond by moving rapidly toward the guide cap. To slow this process, and avoid the inadvertent loss of load holding capacity, the bypass plug 48 forms a seal with a small, fixed orifice. This, in turn, slows the speed that the setting of the CB valve changes, when load pressure is falling.

The operation of CB valve 10 will now be described with respect to FIGS. 4-7. In FIG. 4, CB valve 10 is illustrated in a closed position, at minimum setting. As discussed previously, the spring pack in the CB valve provides a biasing force that seals the piston and the poppet. In addition, grounding spring 38 biases sleeve 30 into its minimum setting. As a result, while the valve operates at its minimum setting, piston 22 seats against poppet 20 sealing flow from load port 1 to valve port 2. The minimum setting can be controlled or refined by altering the spring force generated by the spring pack 34, i.e., by using different springs. As can be appreciated, it is principally the springs that establish a minimum setting that must be overcome by load pressure in order for the piston to open and allow flow between the load port and the valve port.

Figure 5:
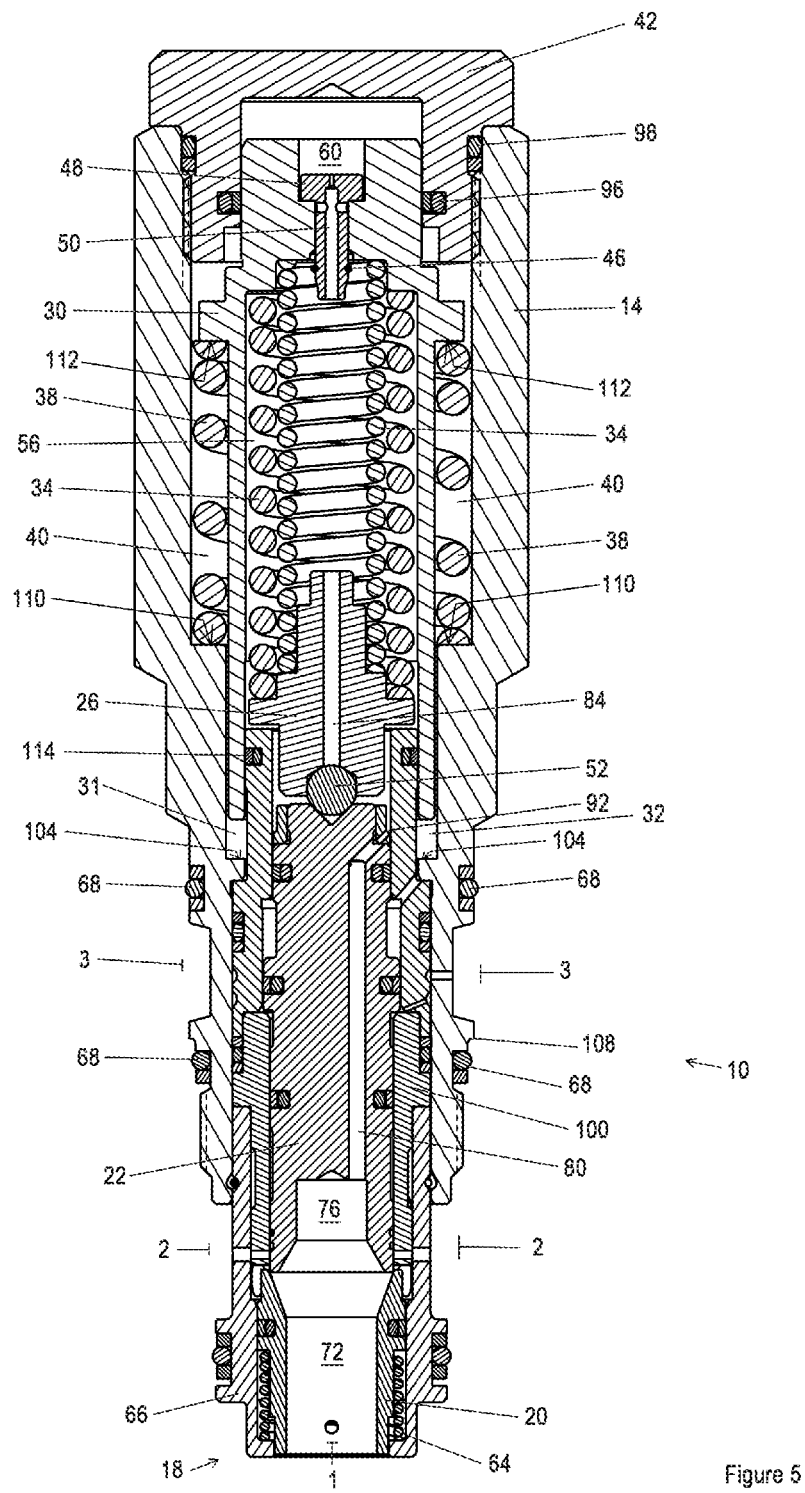
FIG. 5 illustrates a cross-sectional side view of a three-port counterbalance valve according to one aspect of the present invention, at an intermediate setting and seated or closed condition.

FIG. 5 illustrates CB valve 10 in a first intermediate setting, wherein load pressure on load port 1 has exceeded the threshold pressure. More particularly, the condition shown in the first intermediate setting occurs when the load pressure on load port 1 has caused sleeve 30 to slide axially until the forces due to load pressure match the biasing force of the spring pack 34 and the grounding spring 38. This results in constant axial adjustment of sleeve 30 to match the opposing forces created by the load pressure and the spring. This in turn, generates a setting that is higher than load pressure, but just high enough to hold the load within the working parameters of the CB valve.

Figure 6:
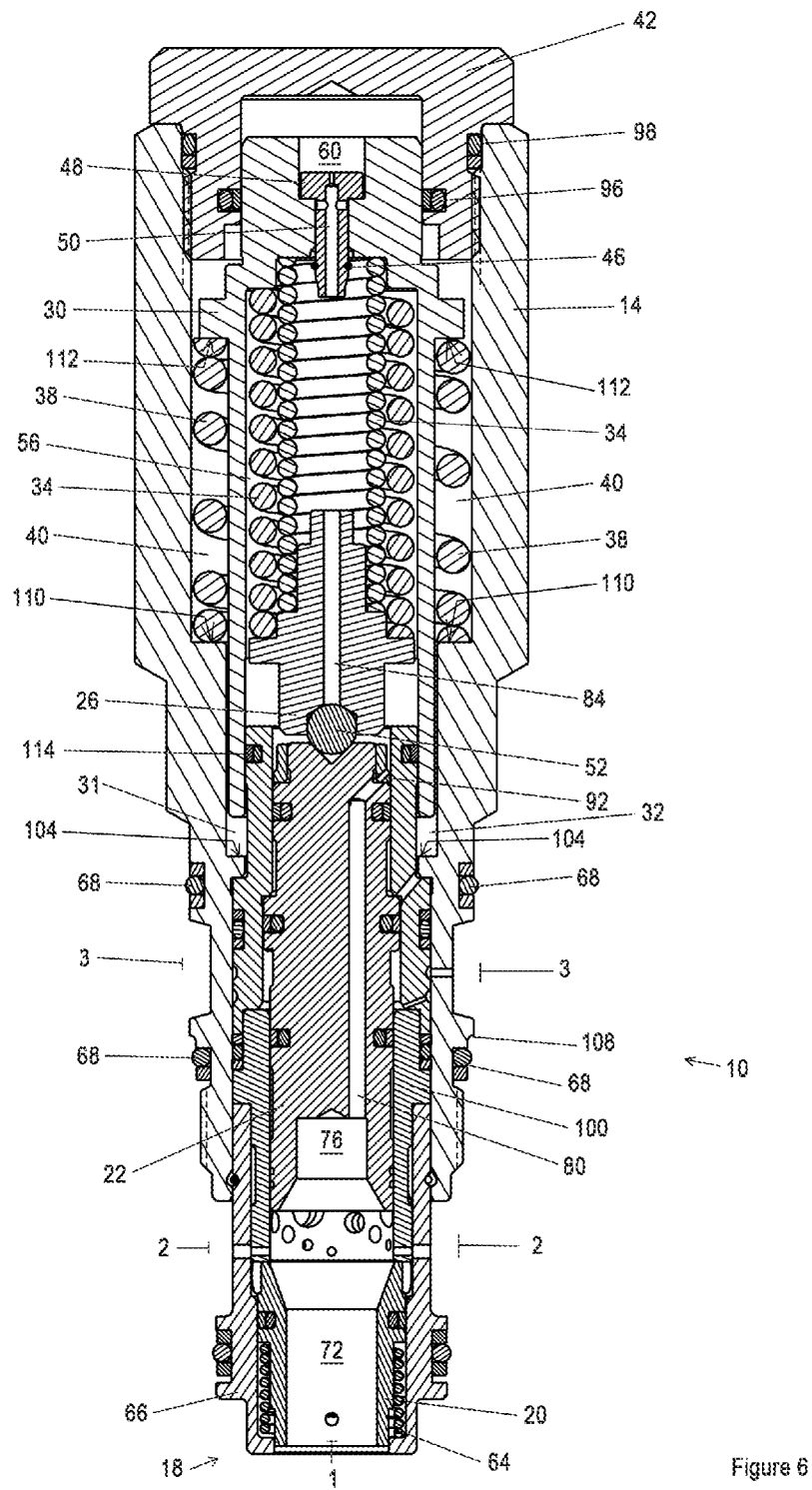
FIG. 6 illustrates a cross-sectional side view of a three-port counterbalance valve according to one aspect of the present invention, at an intermediate setting and fully unseated or open condition.

FIG. 6 illustrates CB valve 10, wherein the load pressure on load port 1 has exceeded the threshold pressure, and a setting has been established. Pilot pressure has opened a flow path between load port and valve port. The valve is modulating and the load is being controlled. To open the flow path, pilot pressure acted on the piston to compress the spring pack, and the spring pack acted on the sleeve, partially uncompressing the grounding spring.

Figure 7:
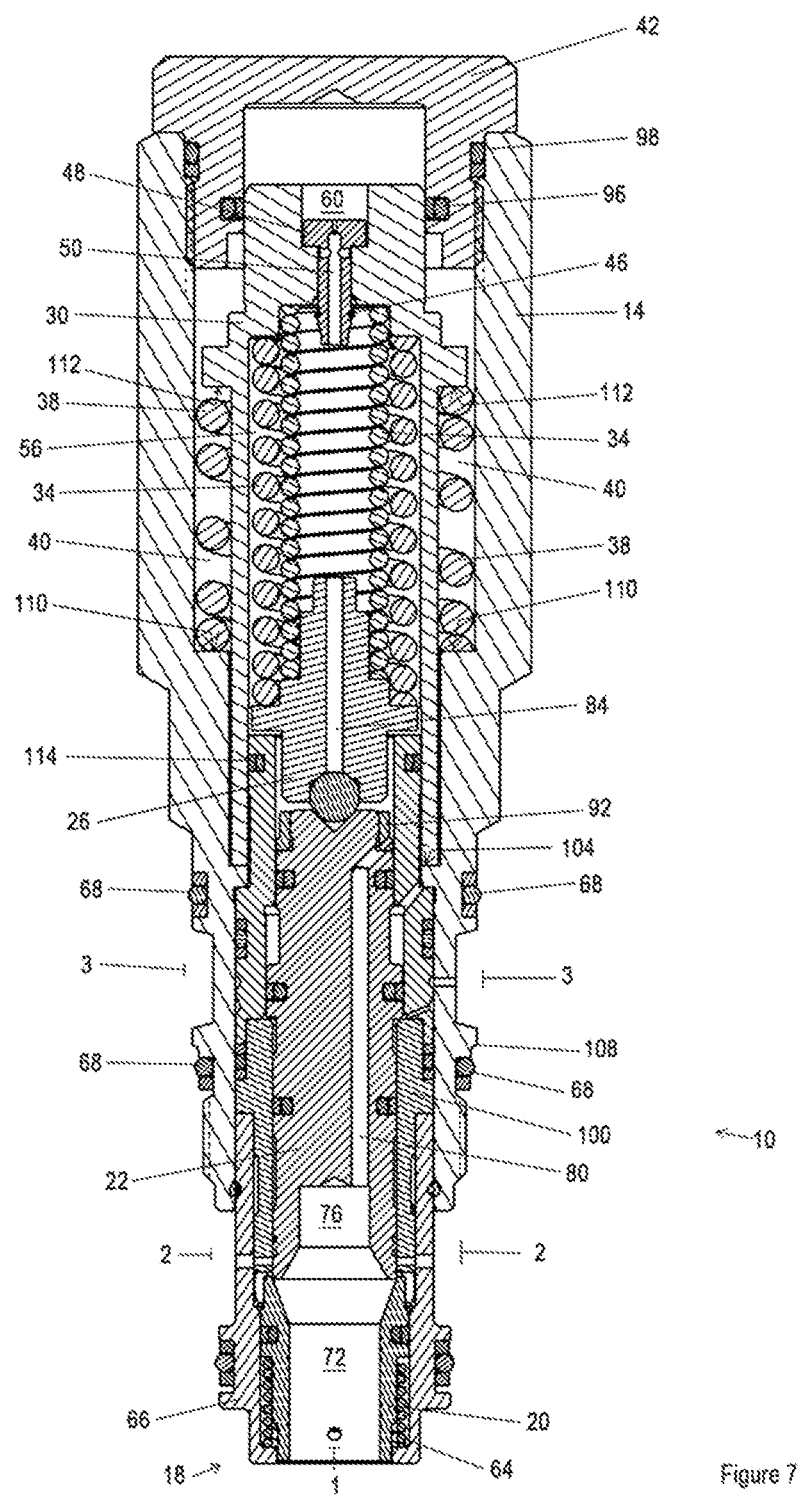
FIG. 7 illustrates a cross-sectional side view of a three-port counterbalance valve according to one aspect of the present invention, at maximum setting and seated or closed condition.
Figure 6:
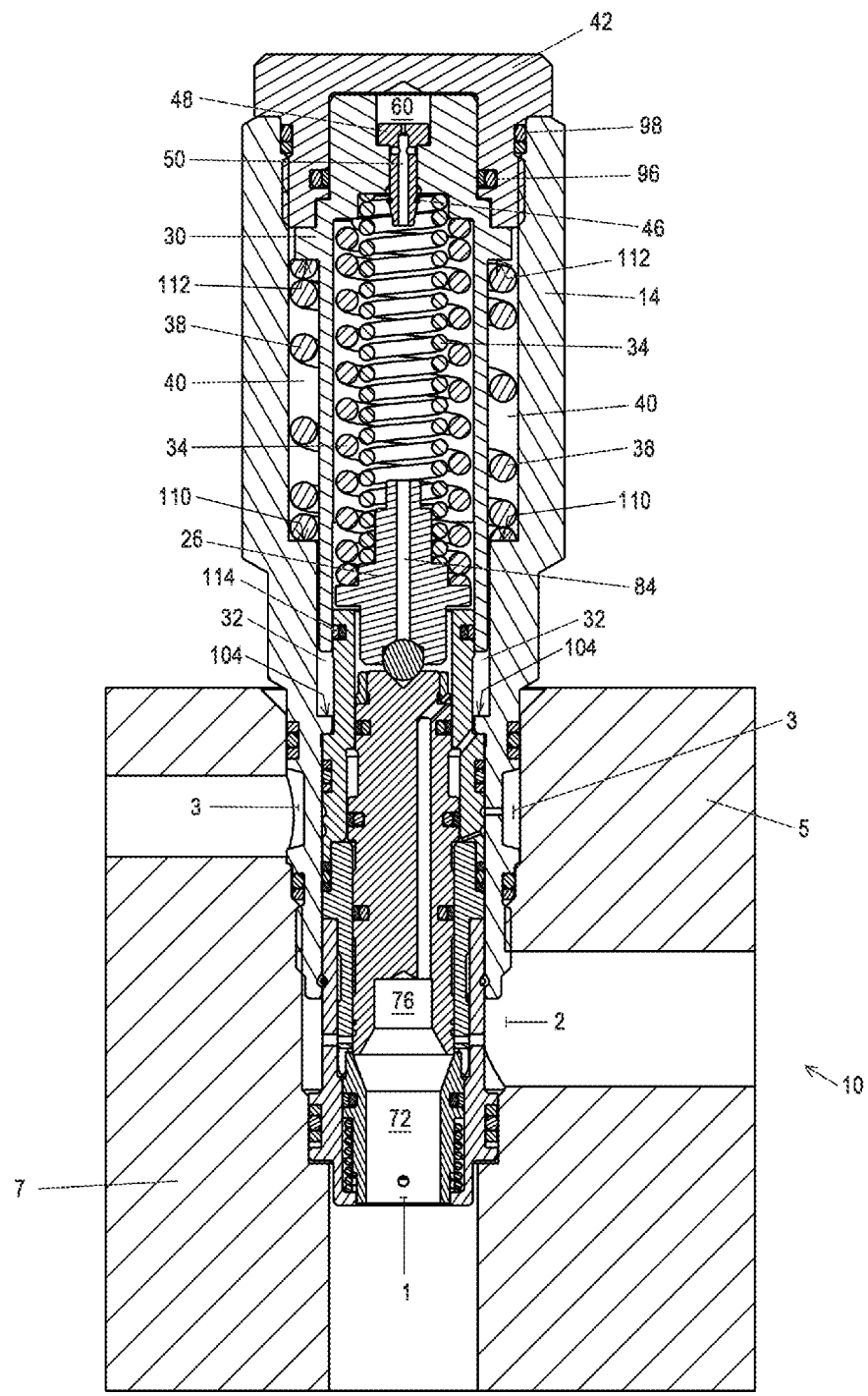

As illustrated in FIG. 7, when the load pressure reaches maximum working pressure, the end of sleeve 30 bottoms out on the valve body shoulder 104. Thereafter, as load pressure increases piston 22 moves to compress inner springs 34 and open a flow path from load port 1 to valve port 2. At this point, the valve acts like a traditional fixed setting counterbalance valve that has reached its setting.

Figure 10:
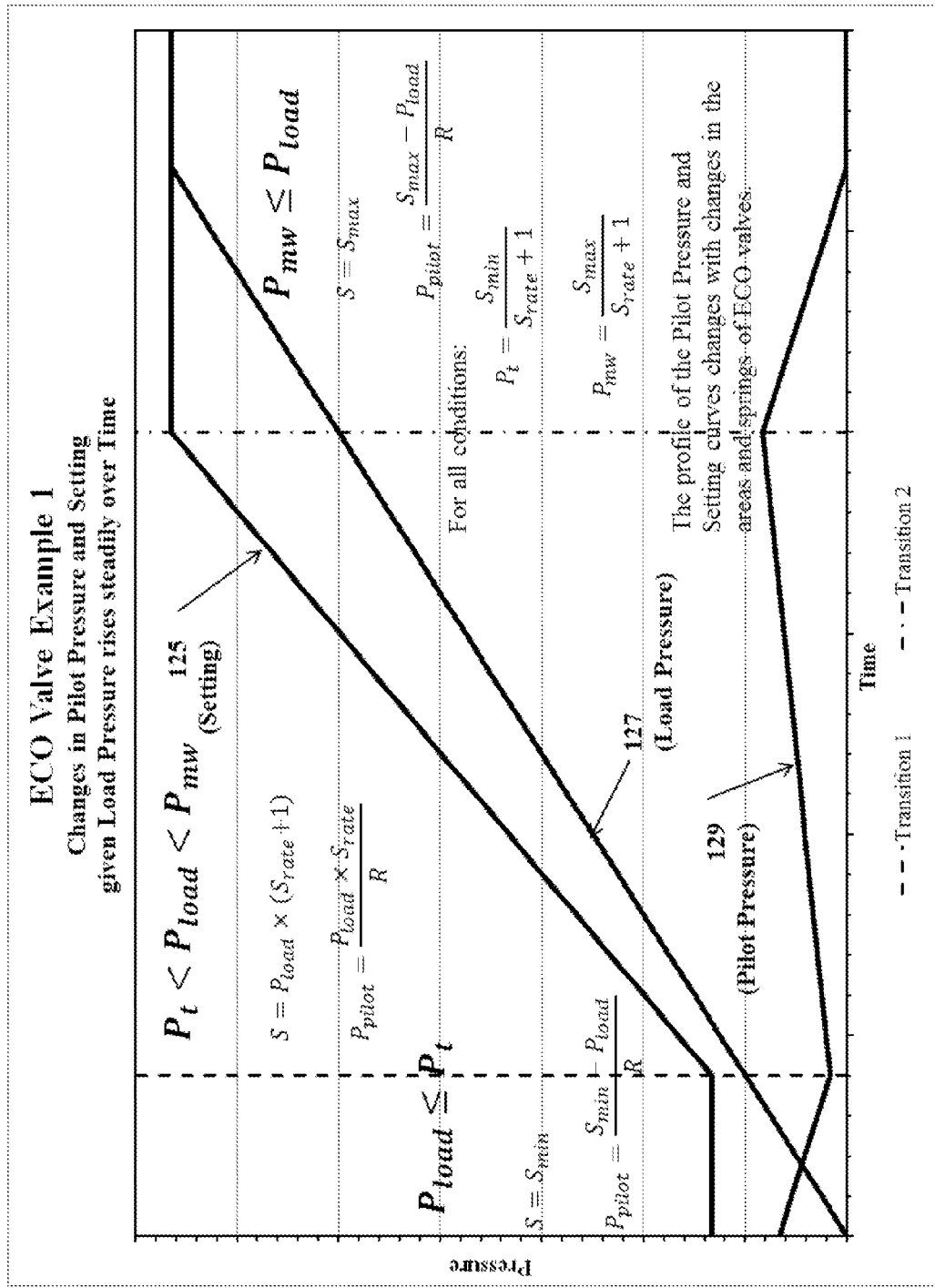
FIG. 10 graphically illustrates one example of the changes in pilot pressure where load pressure rises steadily with time in a CB valve according to one aspect of the present invention.

Each of the four phases of the CB valve of the present invention will now be described, referring to FIGS. 10 and 11. The following equations describe a CB valve according to the present invention where the setting 127 increases at a rate relative to load pressure 125:

For all performance conditions in FIG. 10:

$$P_t = \frac{S_{min}}{S_{rate}+1}$$

$$P_{mw} = \frac{S_{max}}{S_{rate}+1}$$

For performance conditions where $P_{load} \leq P_t$:

$$S = S_{min}$$

$$P_{pilot} = \frac{S_{min} - P_{load}}{R}$$

For performance conditions where $P_t < P_{load} < P_{mw}$:

$$S = P_{load} \times (S_{rate}+1)$$

$$P_{pilot} = \frac{P_{load} \times S_{rate}}{R}$$

For performance conditions where $P_{mw} \leq P_{load}$:

$$S = S_{max}$$

$$P_{pilot} = \frac{S_{max} - P_{load}}{R}$$

Figure 11:
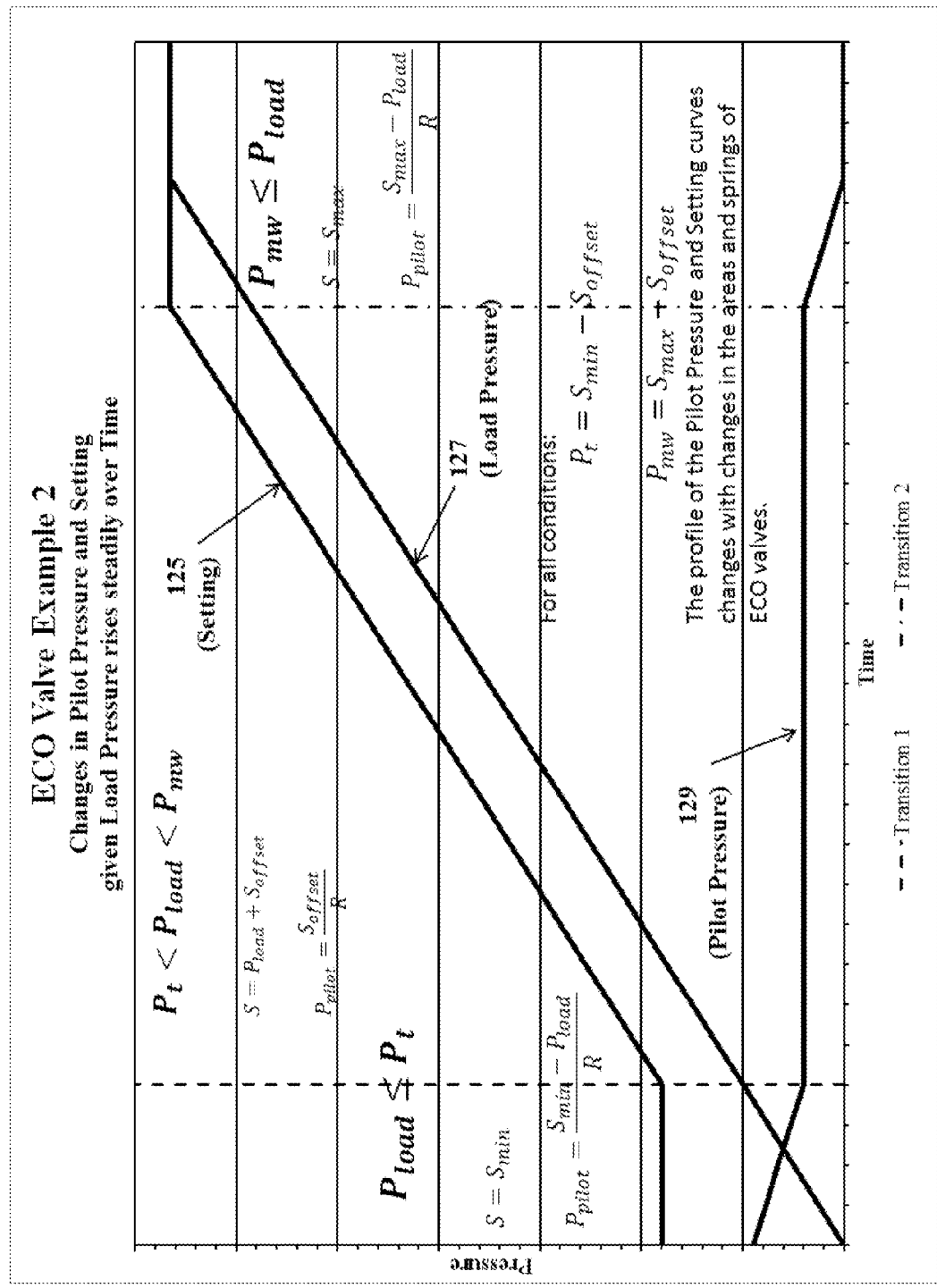
FIG. 11 graphically illustrates another example of the changes in pilot pressure where load pressure rises steadily with time in a CB valve according to one aspect of the present invention.

Alternatively, referring to FIG. 11, the following equations describe a CB valve according to the present invention where the setting 127 is higher than the load pressure 125 by a constant value:

For all performance conditions:

$$P_t = S_{min} - S_{offset}$$

$$P_{mw} = S_{max} - S_{offset}$$

For performance conditions where $P_{load} \leq P_t$:

$$S = S_{min}$$

$$P_{pilot} = \frac{S_{min} - P_{load}}{R}$$

For performance conditions where $P_t < P_{load} < P_{mw}$:

$$S = P_{load} + S_{offset}$$

$$P_{pilot} = \frac{S_{offset}}{R}$$

For performance conditions where $P_{mw} \leq P_{load}$:

$$S = S_{max}$$

$$P_{pilot} = \frac{S_{max} - P_{load}}{R}$$

Turning to FIG. 9, an alternative embodiment of the present invention can be provided with four ports. In general, the CB valve 210 of FIG. 9 is functionally similar to the CB valve 10. However, in addition to a load port 1, a valve port 2, and a pilot port 3, CB valve 210 also includes a drain port 4.

Performance Curves

Figure 12:
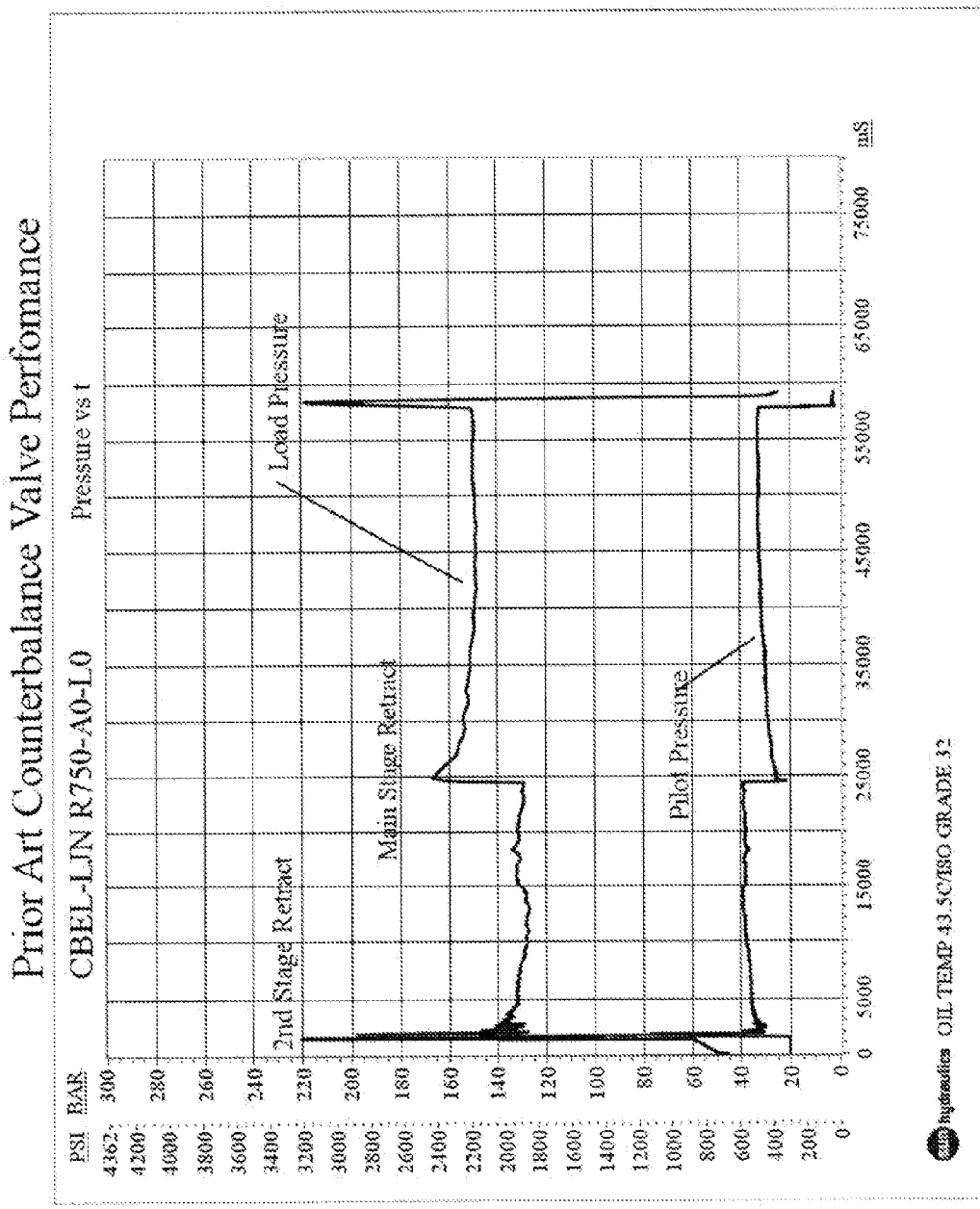
FIG. 12 graphically illustrates the performance of one prior art counterbalance valve, recorded while operating in a machine.

A CB valve according to one aspect of the present invention was subjected to an actual pressure test, and pressure was measured over the time in milliseconds. The results are recorded in FIG. 14. Similarly a prior art CB valve was subjected to actual pressure tests. The prior art CB valve test results are recorded in FIGS. 12 and 13.

Figure 13:
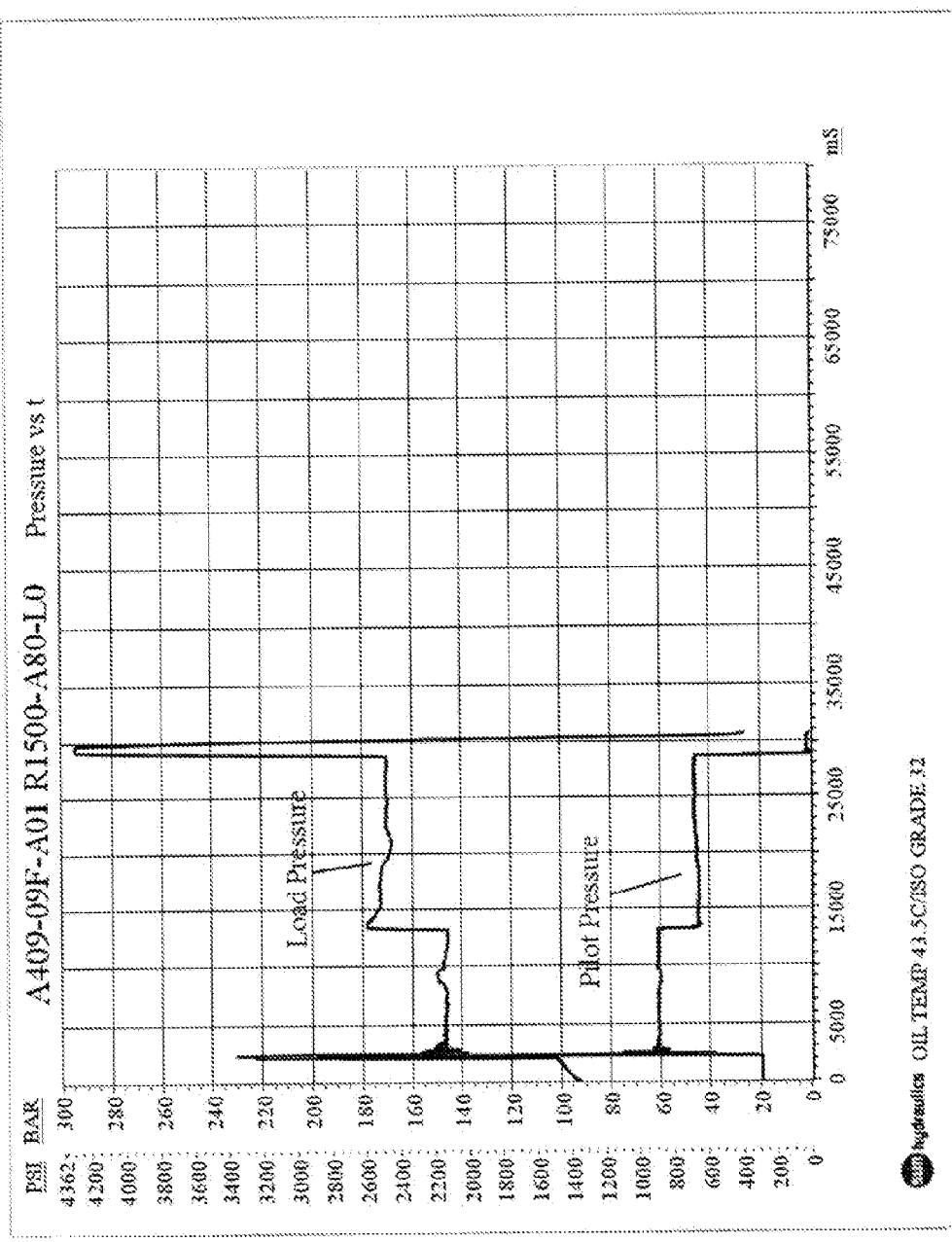
FIG. 13 graphically illustrates the performance of another prior art counterbalance valve recorded, while operating in a machine.
Figure 14:
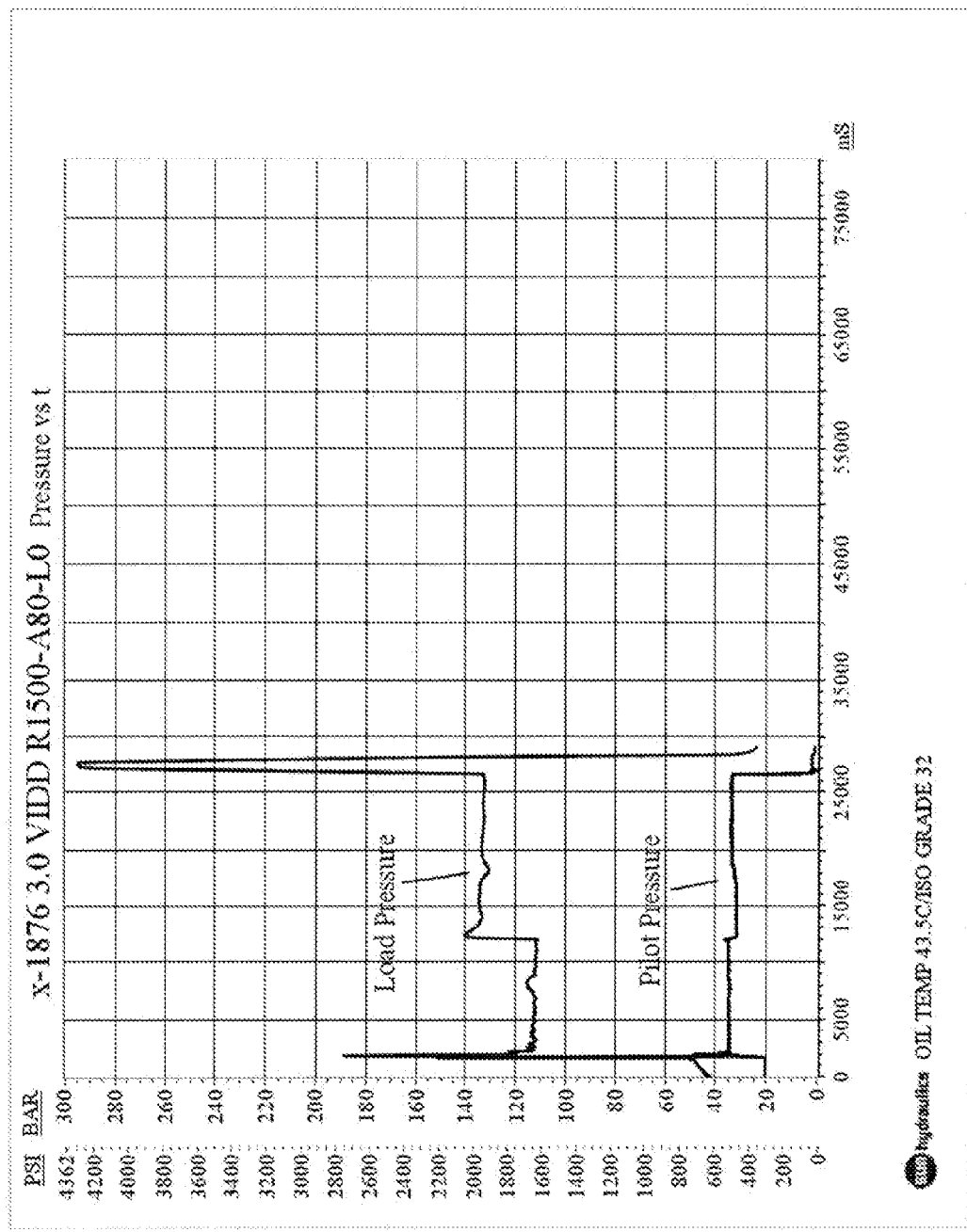
FIG. 14 graphically illustrates the performance of a counterbalance valve according to the present invention, recorded while operating in a machine.

As can be seen from a comparison of curves, FIGS. 13 and 14, the pilot pressure recorded was lower in the CB valve according to the present invention compared to the prior art CB valve. Lower pressure values were recorded for the CB valve of the present invention throughout the entire duration of the test cycle, including the retraction of the second stage and the main stage. The difference was most dramatic at 2nd Stage Retract segment of the test. In particular, the pilot pressure recorded in the CB valve according to the present invention was approximately 35 bar (FIG. 14). By contrast, the pilot pressure recorded for the prior art CB valve was approximately 60 bar (FIG. 13).

In view of the present disclosure, a person of ordinary skill in the art will appreciate that the setting profile of a CB valve of the present invention can be altered or adjusted by changing the differential areas and springs of the CB valve. Therefore, one of ordinary skill in the art will appreciate that the CB valve of the present invention can be readily outfitted to provide a desirable CB valve profile for different applications.

Any other undisclosed or incidental details of the construction or composition of the various elements of the disclosed embodiments of the present invention are not believed to be critical to the achievement of the advantages of the present invention, so long as the elements possess the attributes needed for them to perform as disclosed. Certainly, one of ordinary skill in the hydro-mechanical arts would be able to conceive of a wide variety of valve shapes and sizes and successful combinations of the invention disclosed herein. The selection of these and other details of construction are believed to be well within the ability of one of even rudimentary skills in this area, in view of the present disclosure.

Alternate Embodiments

Other embodiments of the present invention of a counterbalance valve provided with load-sensing, hydro-mechanically setting, features, where the counterbalance valve relief setting changes dynamically based on the load pressure at the load port of the counterbalance valve. In particular, in view of the present disclosure, a person of ordinary skill could incorporate a setting control region 15 as disclosed herein into a variety of different valves, all of which are considered different embodiments of the present invention. Exemplary alternative embodiments include, without limitation:

Direct acting antishock or soft start relief valve;
Direct acting ventable relief valve;
Direct acting ventable antishock or soft start relief valve;
Direct acting normally open restricted reducing valve;
Direct acting normally closed reducing valve;
Direct acting normally open ventable reducing valve;
Direct acting normally open restricted ventable reducing valve;
Direct acting normally closed ventable reducing valve;
Direct acting normally open antishock or soft start reducing valve;
Direct acting normally open restricted antishock or soft start reducing valve;
Direct acting normally closed antishock or soft start reducing valve;
Direct acting normally open antishock or soft start ventable reducing valve;
Direct acting normally open restricted antishock or soft start ventable reducing valve;
Direct acting normally closed antishock or soft start ventable reducing valve;
Direct acting normally open restricted reducing/relieving valve;
Direct acting normally closed reducing/relieving valve;
Direct acting normally open ventable reducing/relieving valve;
Direct acting normally open restricted ventable reducing/relieving valve;
Direct acting normally closed ventable reducing/relieving valve;
Direct acting normally open antishock or soft start reducing/relieving valve;
Direct acting normally open restricted antishock or soft start reducing/relieving valve;
Direct acting normally closed antishock or soft start reducing/relieving valve;
Direct acting normally open antishock or soft start ventable reducing/relieving valve;
Direct acting normally open restricted antishock or soft start ventable reducing/relieving valve; and
Direct acting normally closed antishock or soft start ventable reducing/relieving valve.

Illustrative embodiments of the present invention have been described in considerable detail for the purpose of disclosing the practical, operative structure whereby the invention may be practiced advantageously. The designs described herein are intended to be exemplary only. The novel characteristics and features of the present invention may be incorporated in other structural forms without departing from the spirit and scope of the present invention. The invention encompasses embodiments both comprising and consisting of the elements described with reference to the illustrative embodiments. The invention illustratively disclosed herein suitably may be practiced in the absence of any element which is not specifically disclosed herein. The invention illustratively disclosed herein suitably may also be practiced in the absence of any element which is not specifically disclosed herein and that does not materially affect the basic and novel characteristics of the claimed invention.

Unless otherwise indicated, all ordinary words and terms used herein shall take their customary meaning as defined in The American Heritage Dictionary, Third Edition. All technical terms shall take on their ordinary and customary meaning as established by the appropriate technical discipline utilized in that particular art.

What is claimed is:

1. A counterbalance valve, comprising:
   a valve body having:
      a first end, a second end, and a longitudinal chamber therebetween;
      a load port, a valve port, and a pilot port all of which are configured to communicate with the longitudinal chamber;
      wherein the pilot port is disposed in the valve body;
   a piston positioned within the longitudinal chamber, the piston being longitudinally slidable along the longitudinal axis between an open position and a closed position, wherein in the open position a fluid passageway is established between the load port and the valve port, and in the closed position the load port is sealingly isolated from the valve port;
   a sleeve disposed within the longitudinal chamber, the sleeve being slidable between a minimum position and a maximum position;
   a spring disposed within the sleeve;
   a ball holder disposed within the sleeve, the ball holder compressing the spring within the sleeve;
   a ball disposed between the ball holder and the piston; the sleeve, the spring, the ball holder and the ball collectively biasing the piston into the closed position;
   a grounding spring disposed between an exterior of the sleeve and an interior of the valve body configured to bias the sleeve into the minimum position.

2. The counterbalance valve of claim 1, further comprising a guide cap fixed to the longitudinal chamber, the guide cap defining a terminal chamber for receiving a portion of the sleeve.

3. The counterbalance valve of claim 2, further comprising a cap seal having a first diameter, the cap seal forming a fluid seal between the guide cap and the sleeve.

4. The counterbalance valve of claim 3, further comprising a sleeve guide seal having a diameter smaller than the diameter of the cap seal.

5. The counterbalance valve of claim 2, further comprising a plug disposed within the sleeve, the plug having a passageway for communicating the terminal chamber and an interior portion of the sleeve.

6. The counterbalance valve of claim 5, wherein the plug is configured to allow a faster rate of ingress of fluid into the terminal chamber than the rate of egress of fluid from the terminal chamber.

7. The counterbalance valve of claim 2, further comprising a drain port in valve body.

* * * * *